United States Patent [19]

Goeppel

[11] Patent Number: 5,452,424
[45] Date of Patent: Sep. 19, 1995

[54] WORK STATION AND METHOD FOR SERIALLY PROVIDING CONFIGURATION DATA TO FUNCTIONAL UNITS CONTAINED THEREIN

[75] Inventor: Anton Goeppel, Burgau, Germany

[73] Assignee: NCR Corporation, Dayton, Ohio

[21] Appl. No.: 752,814

[22] Filed: Aug. 30, 1991

[30] Foreign Application Priority Data

Aug. 31, 1990 [GB] United Kingdom ............... 9018989

[51] Int. Cl.⁶ ..................... G06F 13/22; G06F 12/00
[52] U.S. Cl. .................... 395/650; 395/281; 395/284; 364/DIG. 1; 364/280.2; 364/262.5; 364/254; 364/975.2; 364/960.1; 364/957
[58] Field of Search ................... 395/700, 325

[56] References Cited

U.S. PATENT DOCUMENTS

| | | | |
|---|---|---|---|
| 4,688,172 | 8/1987 | Wright | 364/DIG. 1 |
| 4,727,475 | 2/1988 | Kiremidjian | 364/DIG. 1 |
| 4,750,136 | 6/1988 | Arpin et al. | 364/514 |
| 4,775,931 | 10/1988 | Dickie et al. | 364/DIG. 1 |
| 5,038,320 | 8/1991 | Heath et al. | 364/DIG. 2 |
| 5,204,669 | 4/1993 | Dorfe et al. | 340/825.52 |
| 5,214,771 | 5/1993 | Clara et al. | 364/DIG. 1 |

FOREIGN PATENT DOCUMENTS

2209079  4/1989  United Kingdom ......... G06F 9/445

OTHER PUBLICATIONS

IBM Tech. Discl. Bull. vol. 27, No. 7A, Dec. 1984, N.Y. US. p. 397, "Method of LSI Personalization After Resetting", Iida et al.

*Primary Examiner*—Eddie P. Chan
*Attorney, Agent, or Firm*—Douglas S. Foote

[57] ABSTRACT

A method of configuring a plurality of work station units, in which the units share common addresses. The units are activated one at a time with the activated unit being given configuration data corresponding to the common addresses. In this manner, an unlimited number of units of a work station can be configured with a limited number of I/O addresses.

21 Claims, 8 Drawing Sheets

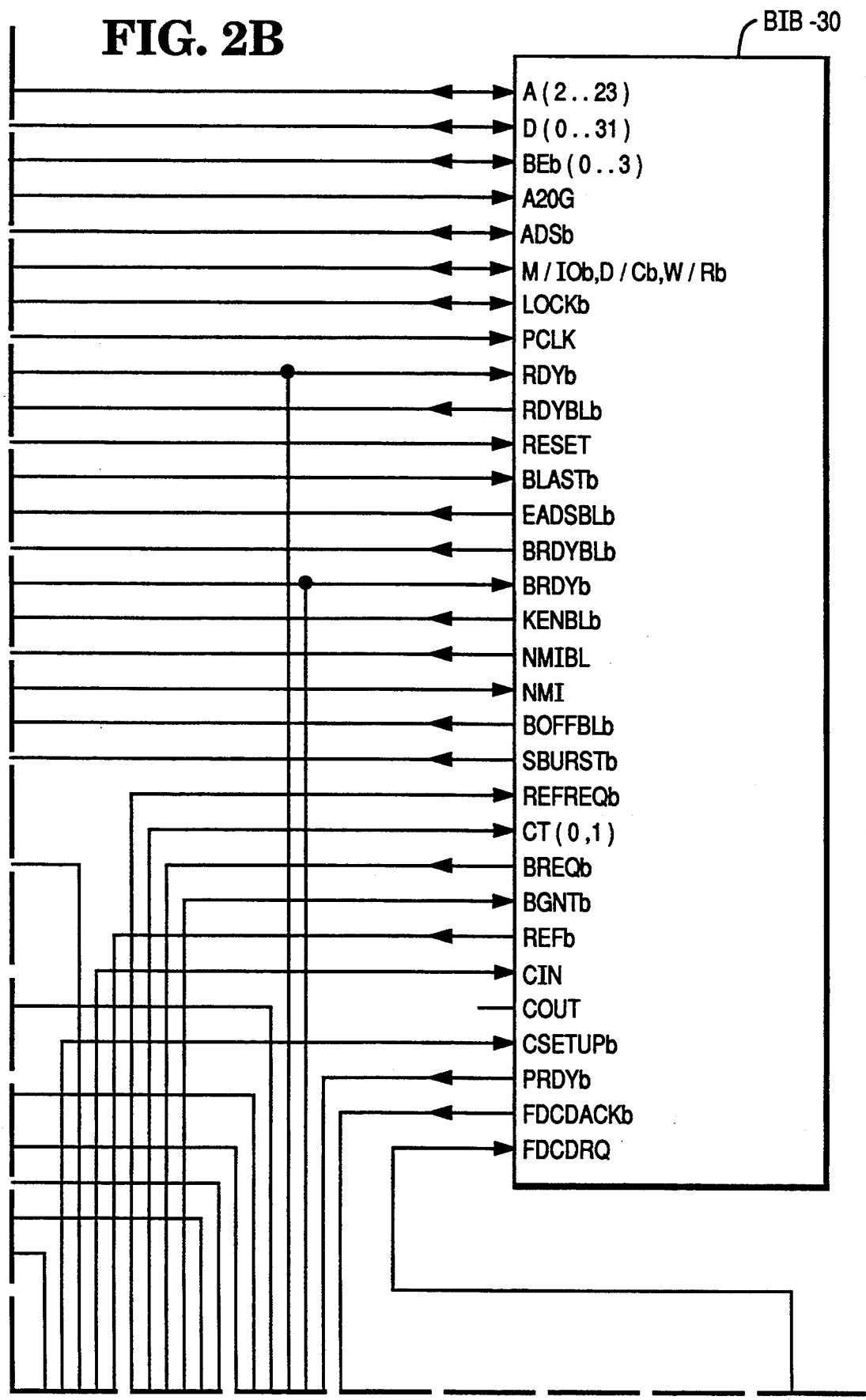

WORK STATION AND METHOD FOR SERIALLY PROVIDING CONFIGURATION DATA TO FUNCTIONAL UNITS CONTAINED THEREIN

This invention relates to a work station or a similar data processing system of the kind having a plurality of units which are configured during start up. More particularly, it relates to a method and system for configuring a relatively large number of such units.

CROSS-REFERENCE TO RELATED APPLICATIONS

"Work Station Having Multiprocessing Capability", U.S. patent application Ser. No. 07/752,744, filed concurrently herewith, invented by Otto Duerrschmid and Edward C. King.

"Work Station or Similar Data Processing System Including Interfacing Means to Microchannel Means", U.S. patent application Ser. No. 07/752,710, filed concurrently herewith, invented by V. Thomas Powell, Anton Goeppel, Edward C. King and G. Roerhl.

"Work Station Including a Direct Memory Access Controller and Interfacing Means to Microchannel Means", U.S. patent application Ser. No. 07/753,273, filed concurrently herewith, invented by Georg Dollinger and Edward C. King.

"Work Station Interfacing Means Having Burst Mode Capability", U.S. patent application Ser. No. 07/752,383, filed concurrently herewith, invented by Edward C. King and Anton Goeppel.

"Internal Bus for Work Station Interfacing Means", U.S. patent application Ser. No. 07/752,371, now U.S. Pat. No. 5,363,492, filed concurrently herewith, invented by Edward C. King and Anton Goeppel.

"Work Station With Timing Independent Interface Units", U.S. patent application Ser. No. 07/752,819, filed concurrently herewith, invented by Edward C. King and Anton Goeppel.

"Register Control for Workstation Interfacing Means", U.S. patent application Ser. No. 07/752,727, filed concurrently herewith, invented by Anton Goeppel.

"Work Station Having Multiplexing and Burst Mode Capabilities", U.S. patent application Ser. No. 07/752,407, filed concurrently herewith, invented by Anton Goeppel and Edward C. King.

"Work Station Including a Direct Memory Access Controller", U.S. patent application Ser. No. 07/752,865, filed concurrently herewith, invented by Anton Goeppel.

BACKGROUND OF THE INVENTION

Known work stations use a specific CPU, e.g. an Intel 80386 microprocessor, provided on a system board together with other chip units such as memories, various peripheral interfaces and a system bus controller. The CPU and the above mentioned devices communicate with each other, partially through buffers, over a local bus comprising control, address and data lines. In general, the system design is tailored for the specific CPU. This means, that a large variety of different chip units are required for work stations using different CPUs. The local bus also is tailored for the specific configuration. In order to maintain compatibility with other systems, detailed specifications rigidly determine the features and functions of the various units and their I/O registers. Thus, it is difficult to modify the system for expansion and improved performance.

Depending on the specific design of the system board and the units to be connected thereto, it is necessary to configure the units of the system board and the cards to be connected thereto, for example when installing the system or making any changes thereto. At one time this was done by switches and other mechanical devices. Recently such mechanical means have been replaced by a so-called Programmable Option Select (POS) installing program which serves to configure the system board and the adapters in a setup mode. With a predetermined rigid system board design, a very small predetermined number of units of the system board are activated via separate setup lines and configured accordingly.

However, if it is desired to have the system board considerably expanded by a varying number of further units, configuring thereof becomes difficult. The main reason for that is that the number of addresses assigned to I/O registers on the system board are rather limited and are occupied or reserved for various purposes.

OBJECTS OF THE INVENTION

It is an object of the present invention to provide a method for configuring a work station having flexible configuration capabilities.

It is a further object of the present invention to provide a work station having widely expanded configuration capabilities.

SUMMARY OF THE INVENTION

Briefly, one form of the present invention is a method of configuring a plurality of work station units, in which the units share common addresses. The units are activated one at a time with the activated unit being given configuration data corresponding to the common addresses. In this manner, an unlimited number of units of a work station can be configured with a limited number of I/O addresses.

More particularly, one form of the present invention is a method of configuring a plurality of series connected functional units of a work station, in which each of the units includes a pointer register, a latch register, and a plurality of configuration registers. The first one in the series of units is activated. Address and corresponding configuration data is consecutively provided to the pointer and latch register, respectively, of the activated unit. Data from the latch register is then written into one of the configuration registers of the activated unit, as selected by the corresponding address held in its pointer register. The next unit of the series is activated for configuration upon a register in the preceding unit receiving a predetermined value.

Another form of the present invention is a work station comprising a plurality of functional units, a local bus connecting the units, and signal lines respectively connecting adjacent units. Each unit has a pointer register, a latch register and a plurality of configuration registers, wherein configuration registers of different units share some common addresses. The pointer register of each unit consecutively selects configuration registers of that unit, and the corresponding latch register consecutively transfers configuration data into an addressed one of the configuration registers. Each signal line provides a signal for activating for configuration the next unit.

BRIEF DESCRIPTION OF THE DRAWINGS

FIGS. 2 and 2A-2E, together constitute a schematic drawing showing in detail a host P/M bus as used to connect the various units with each other.

FIG. 5 is a flowchart diagram of the configuration method according to the present invention.

DESCRIPTION OF A PREFERRED EMBODIMENT

Figure 1:
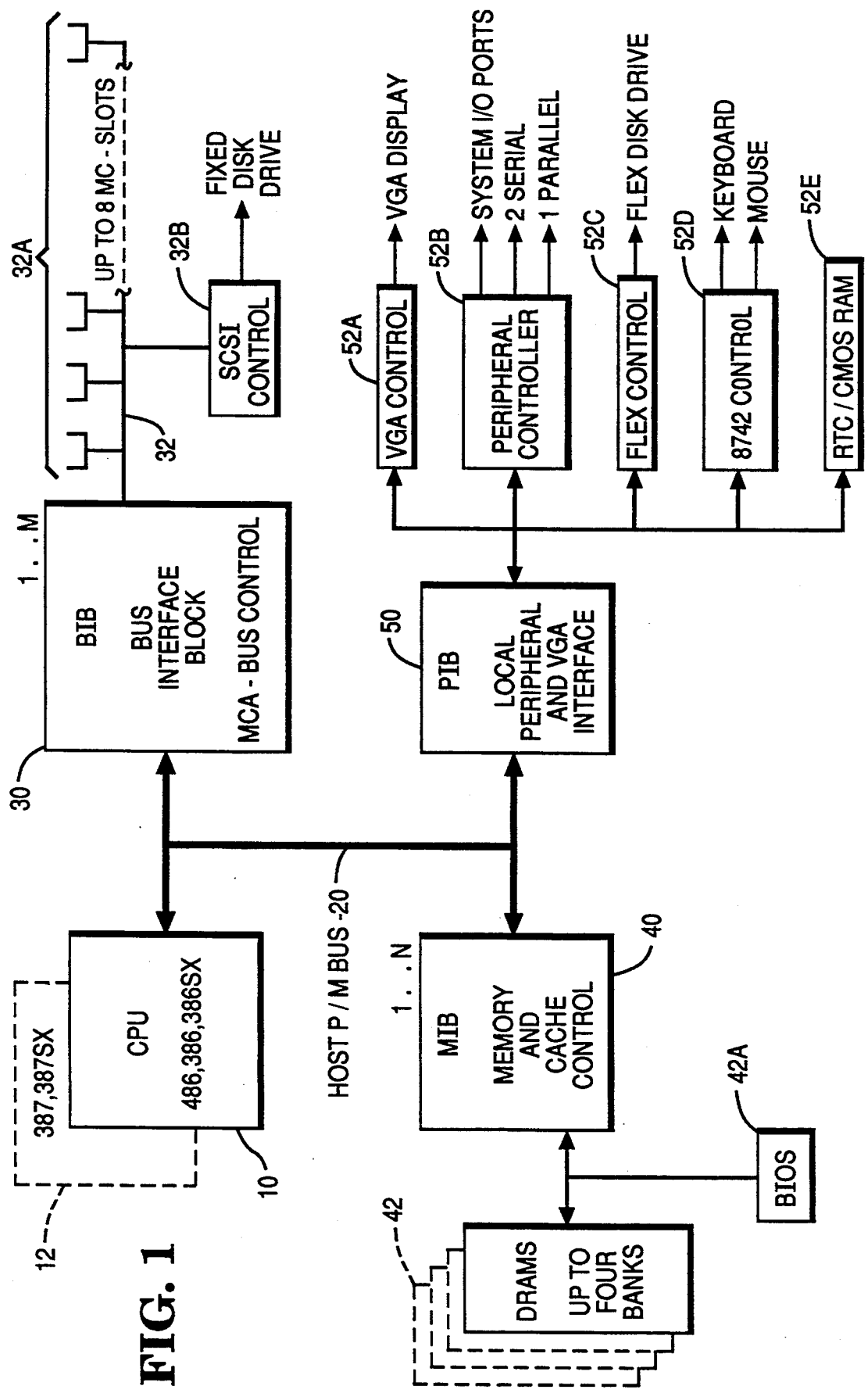
FIG. 1 is a schematic overall view of an embodiment of a work station according to the invention illustrating the various units used and the connections therebetween.

FIG. 1 shows a preferred embodiment of a work station or data processing system according to the invention.

Basically, a CPU 10 communicates through a host P/M bus 20 with functional blocks 30, 40, and 50, and in particular with one or a plurality of bus interface blocks BIB 30 for microchannel access, with one or a plurality of memory interface blocks MIB 40 for memory and cache control, and with a local peripheral and video graphics array (VGA) interface block PIB 50.

It should be noted that different types of microprocessors may be used for the CPU 10, such as the Intel 80386, 80386SX, and 80486 microprocessors. Also, a coprocessor 12, such as a mathematical coprocessor Intel 80387, or 80387SX, may be added.

The functional block BIB 30 is provided as an interface between the host P/M 20 and a microchannel 32 provided with a plurality of slots 32a for attaching conventional adapter boards, including adapter boards provided with a microprocessor which may act as a master in communication with other units of the work station. Furthermore, a SCSI control 32b is connected to the microchannel 32 for controlling a fixed disk drive. The functional memory interface block (MIB) 40 forms as interface between the host P/M bus 20 and a DRAM memory 42 which may have different sizes. Furthermore, the MIB 40 controls access to the usual BIOS ROM memory 42a. The functional peripheral interface block (PIB) 50 forms an interface between the host P/M bus 20 and various conventional system devices and peripheral devices through respective control blocks. Thus, there is provided a VGA control 53a, a peripheral controller 52b, a flexible disk control 52c, a keyboard/mouse control 52d, and a RTC/CMOS RAM device 52e. All these devices are well known in the art, and therefore they will not be described in further detail.

According to the preferred embodiment of the invention, each of the functional blocks BIB 30, MIB 40, and PIB 50 has been specifically designed as one chip each containing all elements such as registers and logic circuitry necessary to establish and perform communication between the host P/M bus 20 and the individual devices connected to each functional block 30, 40, and 50.

As indicated in FIG. 1 it should be noted that a number m of BIBs 30 and a number n of MIBs 40 may be provided all connected to the host P/M bus 20. Thus, a large variety of configurations with different CPUs and significantly different memory capacities may be implemented.

Each functional block 30, 40, 50 is provided with some intelligence providing an operation which is relatively independent of the CPU operation generally governing all functions of the system. Basically, each functional block 30, 40, 50 includes an interface unit between the host P/M bus and an individual interface transaction bus. Although the timing is based on the CPU clock, all operations within the functional block such as read or write operations will be independently performed in one cycle, while the CPU requires at least two cycles of the CPU clock. Accordingly, this type of system architecture offers a considerably improved performance in view of the reduction of wait states for the CPU resulting in a higher overall operating speed.

Figure 2A:
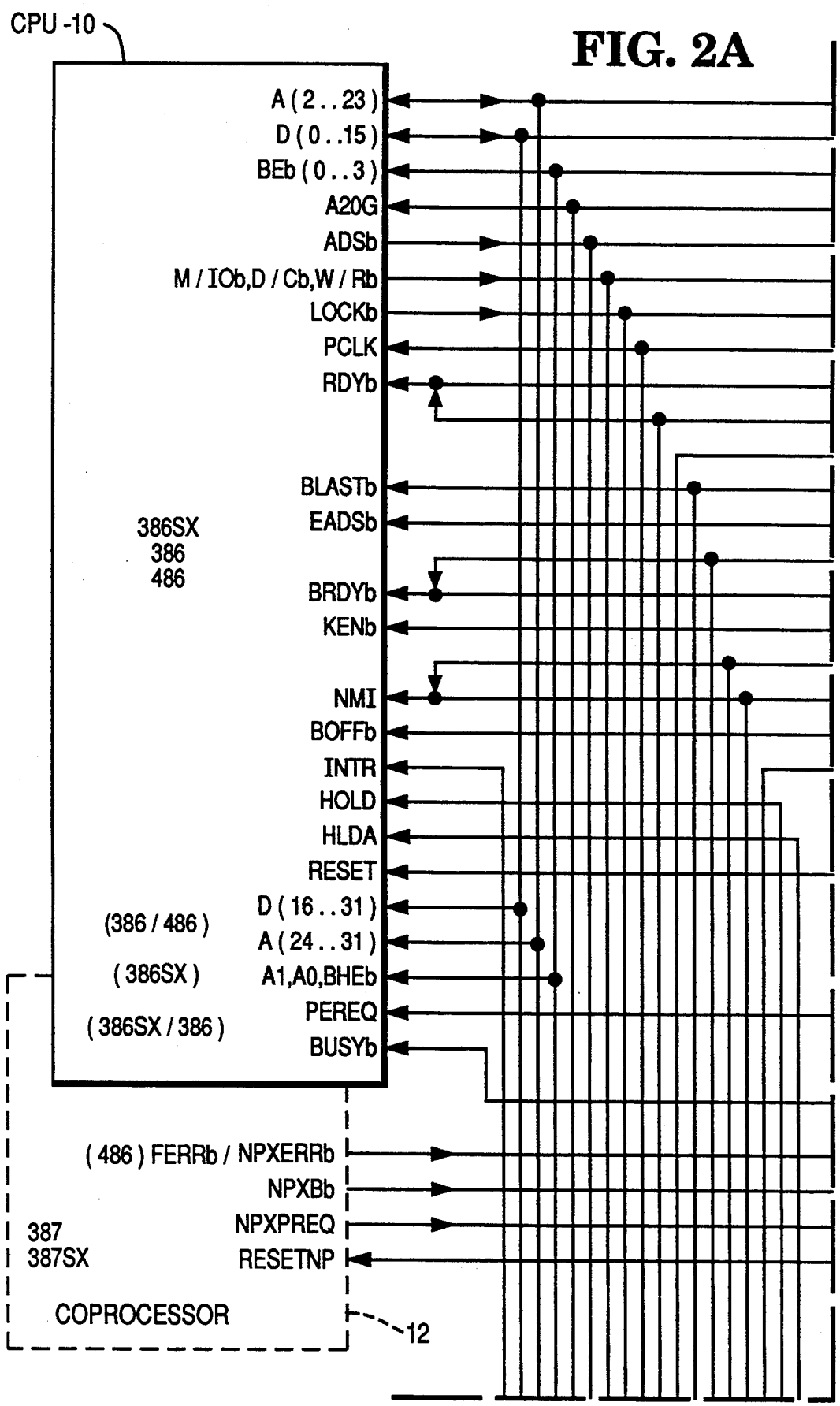
Figure 2C:
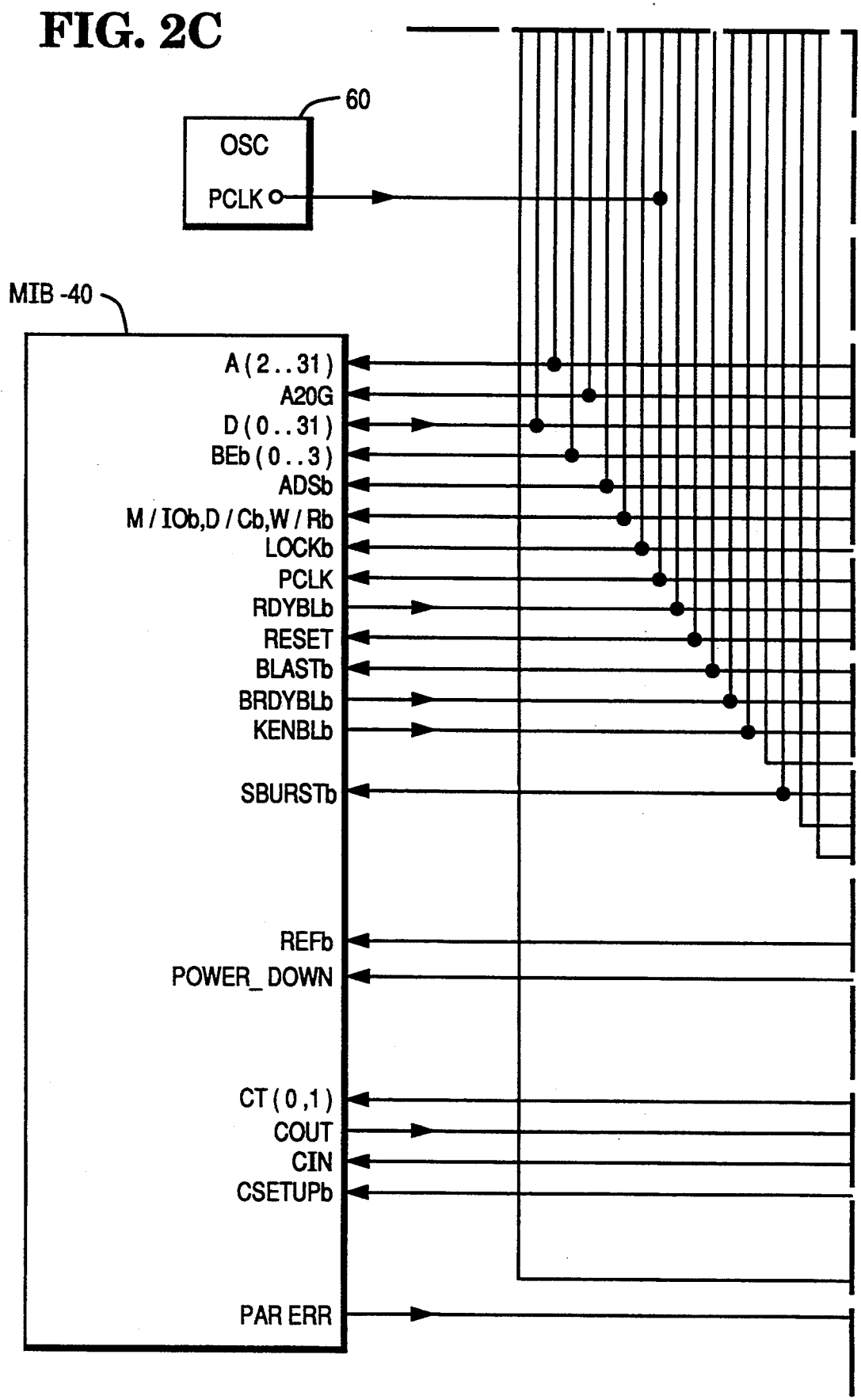
Figure 2D:
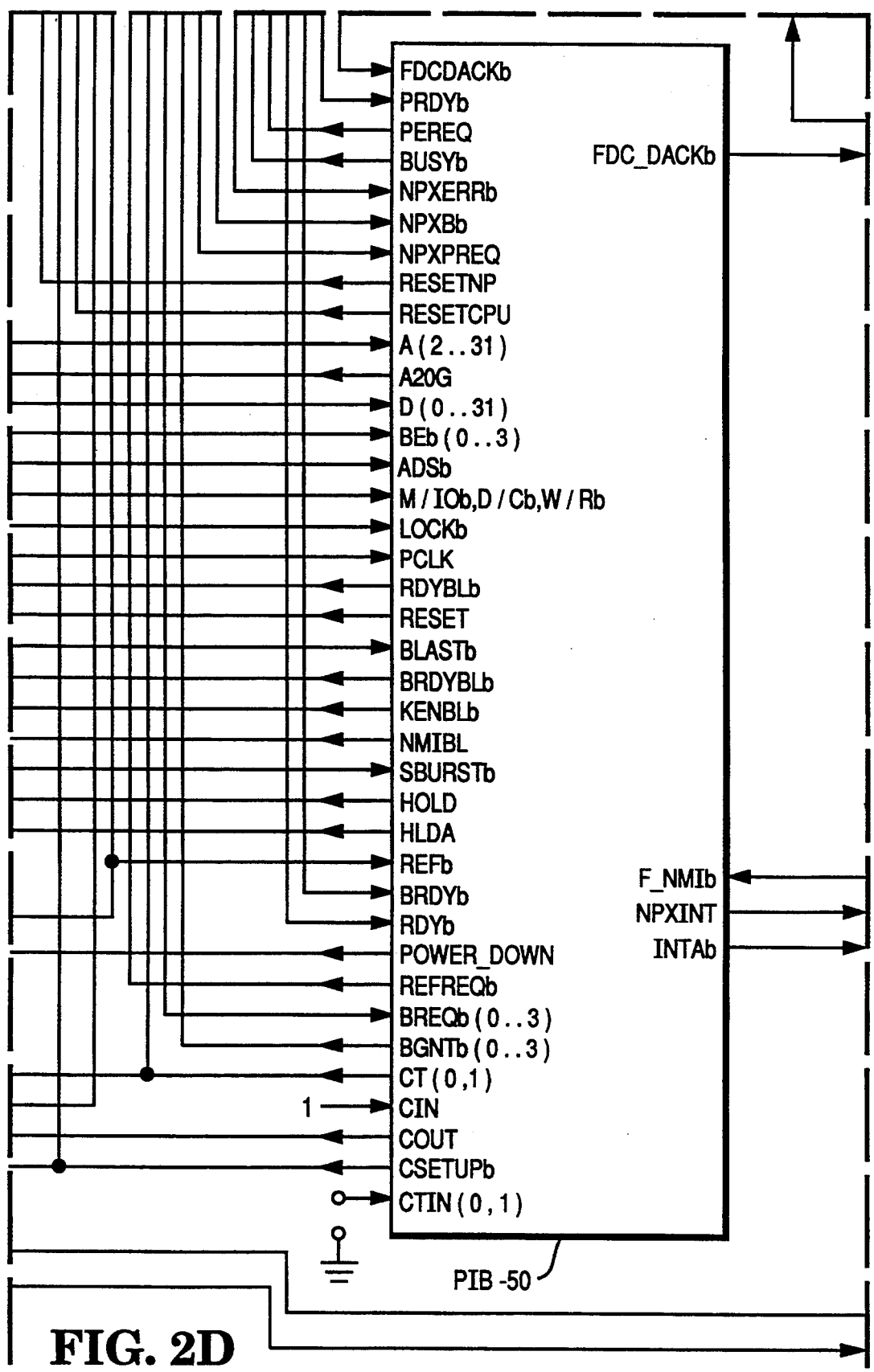
Figure 2:
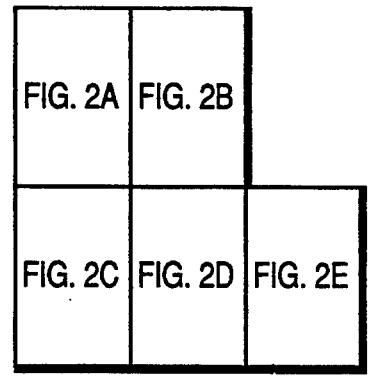
Figure 2E:
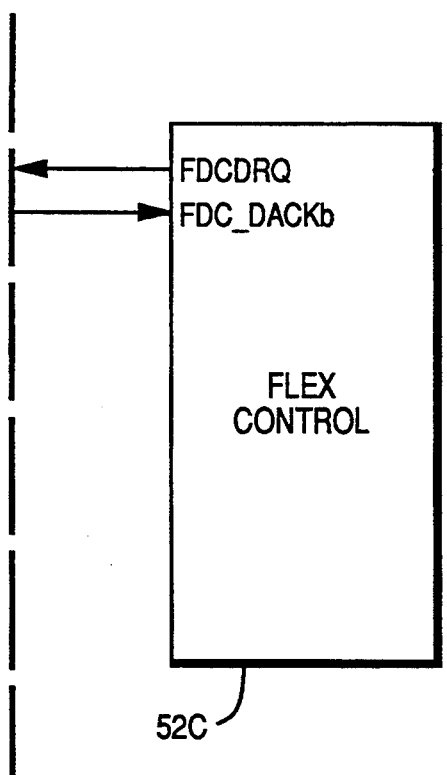
Figure 2E:
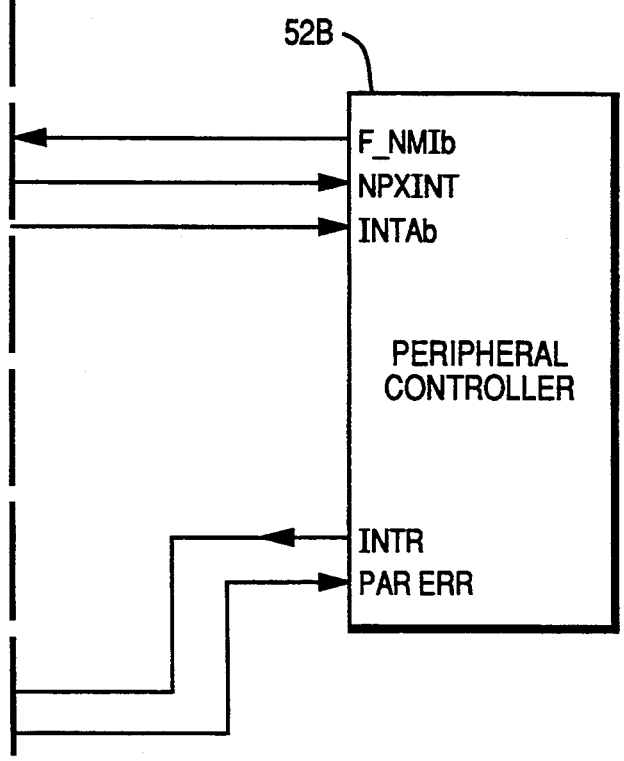

An important feature of the invention is achieved by a specifically extended host P/M bus which is illustrated in FIG. 2.

Specifically, within the block CPU 10 the conventional input/output ports of a microprocessor such as Intel 80386, etc. are listed as address ports A(2, ... 23), data ports D(0, ... 15), byte enable ports BEb(0, ... 3), and an address status output port ADSb which indicates that a valid bus cycle definition and address are available and which is driven active in the same clock as the addresses are given. ADSb is active low. The system clock PCLK is generated by a clock oscillator 60 and supplied to the input port PCLK of the CPU 10 and the input port PCLK of the functional blocks BIB 30, MIB 40, and PIB 50. These and all other input/output ports of the CPU 10 and the signals presented there are conventional. Thus, they will not be explained in further detail.

As may be gathered from FIG. 2, the functional blocks BIB 30, MIB 40, and PIB 50 are provided with input/output ports similar to those of the CPU. However, there are several additional ports and associated bus lines connecting corresponding ports of the functional blocks BIB 30, MIB 40 and PIB 50 and the CPU 10 with each other. The ports CIN, COUT, CSETUPb and RESET, and corresponding signals, are of specific interest since they are used in the configuration procedure of the present invention. As may be gathered from FIG. 2, the signal CSETUPb originates from the PIB 50 and is received by all functional blocks BIB 30 and MIB 40 of which a plurality may be provided. The signal CSETUPb when active low acts as an enabling signal which puts all functional blocks in the SETUP mode.

The signal RESET, which also originates from the PIB 50, is used to clear all internal configuration registers inside the functional blocks to a standard or default state before starting a configuration procedure.

Figure 3:
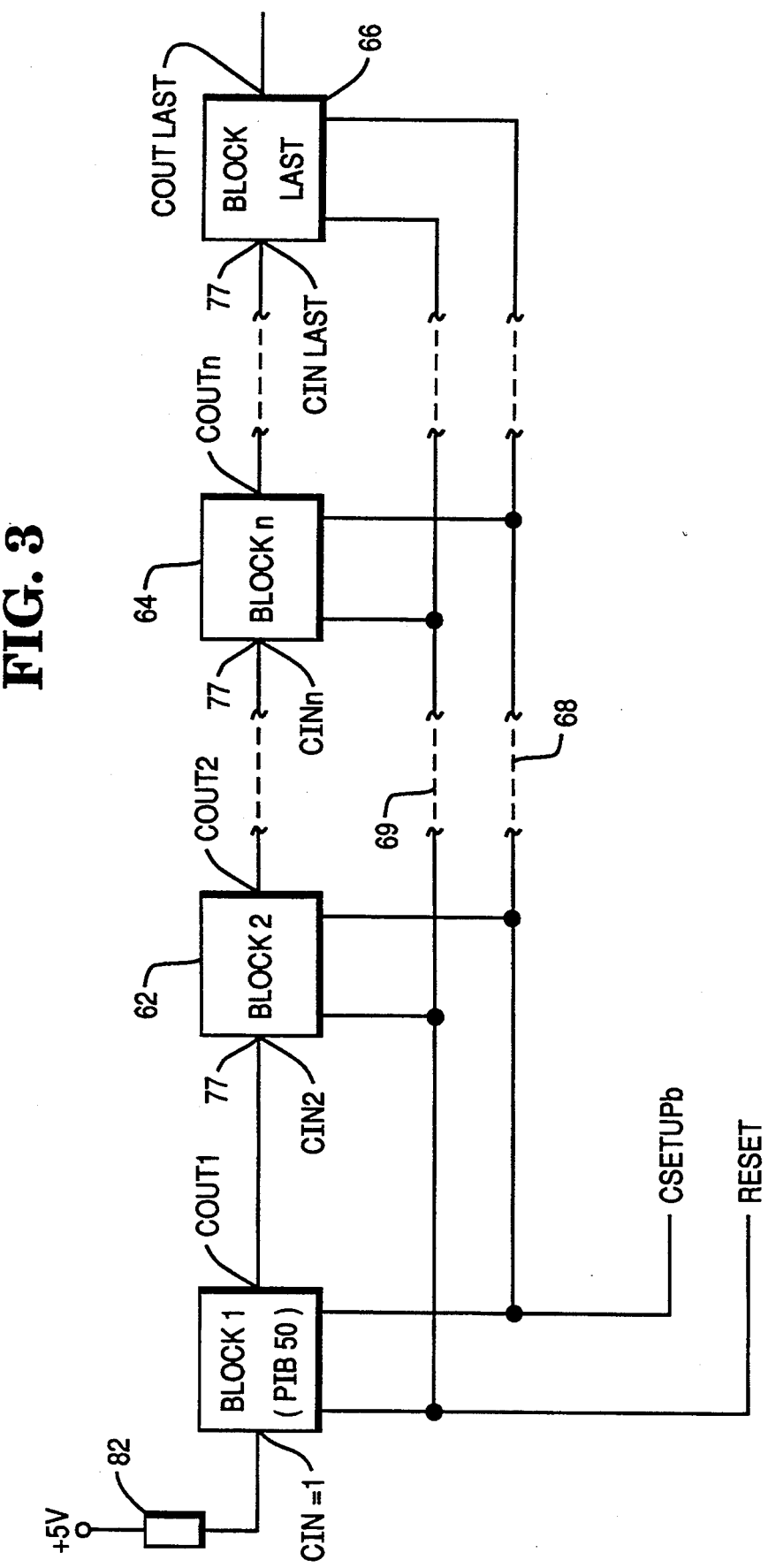
FIG. 3 is a block diagram for explaining the specific feature of the invention.

The signals CIN, COUT, CSETUPb and RESET indicated in FIG. 2 are also shown in FIG. 3.

FIG. 3 illustrates a feature of the present invention, e.g. the chaining of all functional blocks and their successive configuration. The first block, block 1, is the PIB 50, while each of the subsequent blocks such as block 2 ... block n ... block last (respectively indicated 62, 64, 66) may be either a BIB 30 or a MIB 40.

Figure 4:
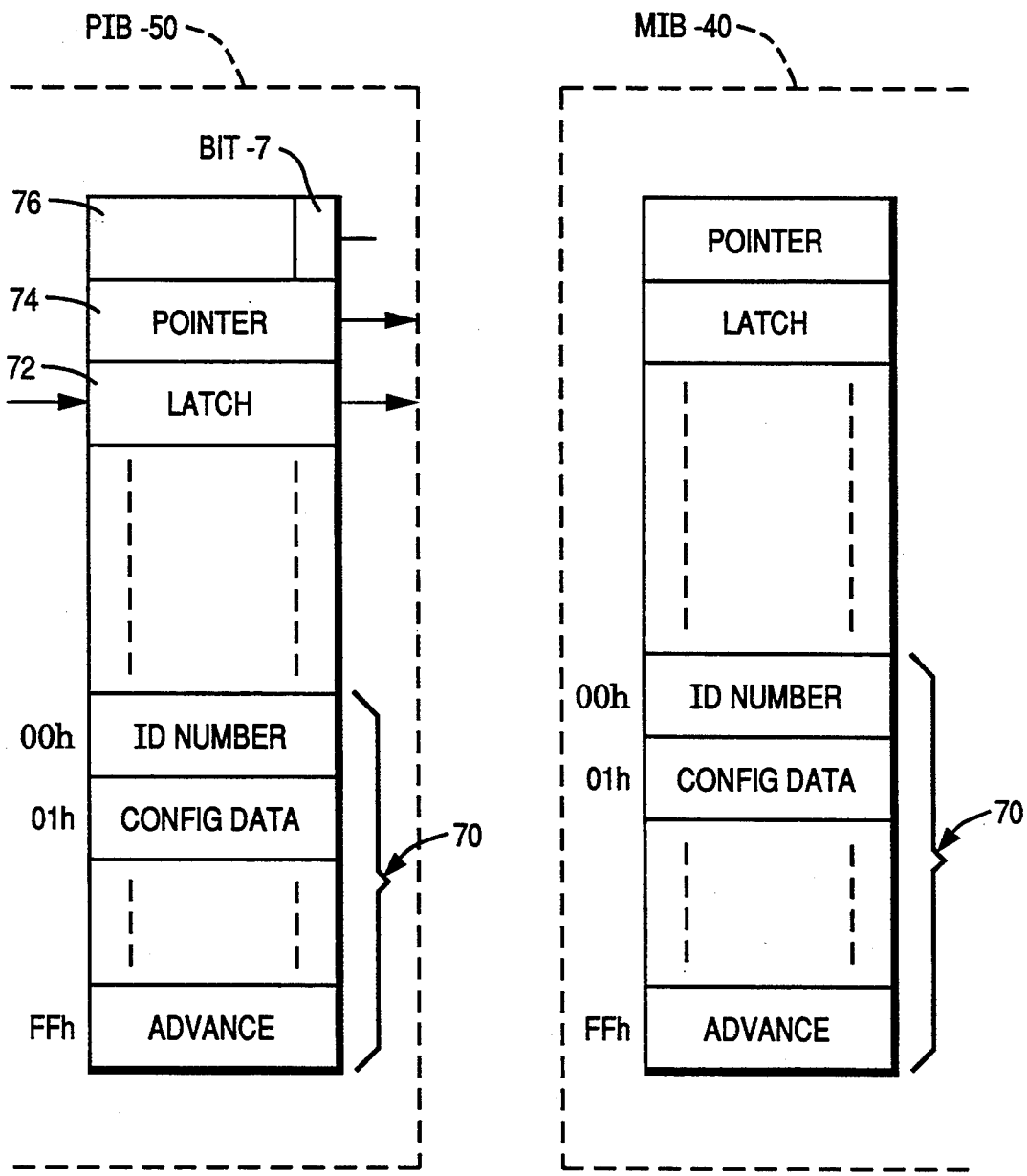
FIG. 4 is a diagram of the registers used with the configuration procedure according to the invention.

Prior to describing the configuring procedure in more detail, it appears necessary to give some explanation of the input/output (I/O) registers used in this procedure, which is done with reference to FIG. 4.

Some registers are directly addressable and accessible from the local bus, e.g., registers 76, 74 and 72, as shown in FIG. 4. Furthermore, each functional block includes a larger number of 1-byte configuration registers, e.g. 256 with register addresses from 0 to FFhex (=255). Such a block of configuration registers is marked with reference numerals 70. These registers 70 share the common addresses 0 to FFhex but are addressable only internally to their respective block PIB 50, MIB 40 or BIB 30.

It should be understood that most of the registers are preoccupied in that they have a standard assignment. Thus, the configuration information to be stored therein is narrowly limited. In order to overcome this limitation, the configuration procedure of the present invention uses just one of the registers in each block, e.g. the register 74 for storing one of the subaddresses 0 to FFhex of the register block 70 of any of the functional blocks 30, 40, and 50. Register 72 is used for latching configuration data to be stored in a subaddress indicated by the pointer of register 74.

As indicated in FIG. 4, PIB 50 includes a further register 76. Whenever bit position 7 of the register 76 is set to "0" the system board is set into the SETUP mode.

As regards the individual registers of the register block 70 of each of the functional blocks 30, 40 and 50, the subaddresses 0 to FFhex are divided into several address ranges receiving predetermined configuration data for each of the functional units of each block. As an example, address range 01hex to 3Fhex may be used for the host P/M interface respectively associated with the BIB 30, MIB 40, and PIB 50. An address range 40hex to 7Fhex may be used for configuration data relating to a DMA unit of the BIB 30, a cache controller of the MIB 40, and a synchronizing unit of the PIB 50, and so on. As will be appreciated, configuration data is used to dynamically provide a system with information related to the types and number of devices connected to the system and with other operational information.

Generally, register 00hex is used for storing an ID number for the associated functional block.

The SETUP procedure according to the invention will now be described in conjunction with FIG. 5.

First, in an I/O write cycle, the digit 0 is written in bit 7 of the register 76 of the PIB 50, which initiates a SETUP mode for the system board. Normally, the CPU or other device controlling the configuration of the system will write to register 76 a data byte (a code) having a 0 in bit position 7. PIB 50 will then generate the CSETUPb signal which is applied to all of the functional units to enable them for configuration. Block 82 in FIG. 5 represents the controlling device providing a RESET signal on line 68 to reset all of the units prior to activating the first one for configuration. While the signal RESET on line 68 and the signal CSETUPb on line 70 are high, all functional blocks clear their COUT signals to logic 0. All blocks check their CIN signals when the signals RESET and CSETUPb go low. It should be noted that all blocks are connected in series chain for the configuration procedure, with an input line 77 (FIG. 3) receiving the output signal COUT from the preceding unit. Referring to FIG. 3, the CIN port of the first block PIB 50 is connected via a pull up register 82 to a +5 V source so that an activating signal (logic 1) is continuously applied to the CIN port of block 1. With CIN=1 of block 1, this block is activated for configuration when the block receives an active low enable signal CSETUPb over line 68.

Configuration of a unit starts with an address being provided to pointer register 76. The first address in register 76 will normally be 00h which points to (addresses) register 00h containing the block ID number. After the ID number of the current block is read, an address and corresponding configuration data are provided to the pointer register 74 and latch register 72, respectively, as indicated by blocks 84 and 86 in FIG. 5. The pointer register 74 uses the address to point to or select a configuration register (normally the one with the next subaddress, e.g. 01hex), and the corresponding configuration data in latch register 72 is then written in register address 01 of the register block 70, as indicated by block 88 in FIG. 5.

Address and corresponding configuration data is consecutively provided to pointer register 74 and latch register 72, respectively, as indicatd by block 90 in FIG. 5. With the pointer sequencing through all the addresses 00hex to FFhex of the register block 70, various configuration data is entered into the block 70. When the pointer arrives at address FFhex, signal COUT is generated (see FIG. 3) causing signal CIN2 to go to logic 1 activating block 2 by setting it into the SETUP mode, as indicated by block 92 in FIG. 5. A functional block is activated for setup only when its input signal CIN is active and output signal COUT is inactive. Thus, when block 62 is activated by CIN2 going active high, block PIB 50 is deactivated by COUT1 going active high, as indicated by block 94 in FIG. 5.

The above mentioned steps are repeated until all blocks 62 to 66 have been appropriately configured, as indicated by block 96 in FIG. 5. Finally, bit position 7 of register 76 is set to "1", thereby releasing the system from the SETUP mode. It should be understood that the present invention is not limited to the use of the predetermined final address FFhex to activate COUT, and other predetermined values may be selected.

It should be noted that all configuration data for a specific system configuration is usually stored on a flexible reference disk and is entered through the PIB 50.

In the foregoing description there has been explained a novel configuration procedure for the system board of a work station. Similarly, this procedure may be applied to a configuration procedure for adapters added to the system. Since all functional blocks are connected in a chain, any number of functional blocks may be used for the system and these functional blocks are configured appropriately in the manner explained above using only one pointer register and one latch register in each block or unit for addressing and configuring of the multiple configuration register block 70 of its respective functional block, such as BIB 30, MIB 40, and PIB 50.

The detail design of the present invention is captured in CDL, a high level hardware description language. CDL is a software tool which unambiguously defines the hardware for a digital logic system. The following CDL listing is an example of the implementation of the relevant part of the preferred embodiment of the work station of this invention. The listing may be compiled to generate a "C" source code which may then be compiled by a C compiler to generate a standardized C object file format. A logic synthesis program is available from the attached CDL listing (Appendix A).

It will be clear to those skilled in the art that the present invention is not limited to the specific embodiment disclosed and illustrated herein. For example, the configuration registers 70 in different units share some common addresses but would not necessarily have to share all addresses. Numerous modifications, variations, and full and partial equivalents can be undertaken without departing from the invention as limited only by the spirit and scope of the appended claims.

What is desired to be secured by Letters Patent of the United States is as follows:

```
/* ---------------------------------------------------------
                      APPENDIX A
                      ---------

MULTIPROCESSOR SYNC POINT

----------------------------------------------------------*/

.INPUT   HARB[3..0];      /* MC ARBITRATION LINES */
.INPUT   CSb;             /* CHIPSELECT FROM HOST P/M IF */
.INPUT   VALIDb;          /* VALID FROM HPI */
.INPUT   IW_Rb;           /* CYCLE DEFINITION SIGNALS */
.INPUT   IBEb[3..0];      /* BYTE ENABLES ON XACT BUS */
.INPUT   IRESET;          /* RESET LINE ON XACT BUS */
.INPUT   NPCLK;

.OUTPUT  SLINE;           /* SYNC POINT REACHED SIGNAL */

.BIDI    ID[31..0];

/* THE SIGNALS IM/IOb & ID/Cb ARE INCLUDED IN SIGNAL CSb!  */
/* WE WILL KEEP THESE TWO SIGNALS NETHERTHELESS IN THE     */
/* DESIGN FOR FARTHER PORPOSES !!!                         */

.IFLEVEL TOP
.CLOCK NPCLK;
.EDGE RISING NPCLK;
.VECTOR 0;
.ELSE
.INPUT NPCLK;
.ASSIGN NPCLK;
.EDGE RISING NPCLK;
.ENDIF

/* DECODE WHAT BIT TO SET OR RESET
     DEPENDING ON THE ARBITRATION VALUE ON HARB[3..0] */

SELW = !CSb & !VALIDb & IW_Rb;

SP[0] := SELW & (HARB[3..0] == 0) & !IRESET & ID[0]
     # SP[0] & !IRESET & !(SELW & (HARB[3..0] == 0) & !ID[0]);
SP[1] := SELW & (HARB[3..0] == 1) & !IRESET & ID[0]
     # SP[1] & !IRESET & !(SELW & (HARB[3..0] == 1) & !ID[0]);
SP[2] := SELW & (HARB[3..0] == 2) & !IRESET & ID[0]
     # SP[2] & !IRESET & !(SELW & (HARB[3..0] == 2) & !ID[0]);
SP[3] := SELW & (HARB[3..0] == 3) & !IRESET & ID[0]
     # SP[3] & !IRESET & !(SELW & (HARB[3..0] == 3) & !ID[0]);
SP[4] := SELW & (HARB[3..0] == 4) & !IRESET & ID[0]
     # SP[4] & !IRESET & !(SELW & (HARB[3..0] == 4) & !ID[0]);
SP[5] := SELW & (HARB[3..0] == 5) & !IRESET & ID[0]
     # SP[5] & !IRESET & !(SELW & (HARB[3..0] == 5) & !ID[0]);
SP[6] := SELW & (HARB[3..0] == 6) & !IRESET & ID[0]
     # SP[6] & !IRESET & !(SELW & (HARB[3..0] == 6) & !ID[0]);
SP[7] := SELW & (HARB[3..0] == 7) & !IRESET & ID[0]
```

```
        # SP[7] & !IRESET & !(SELW & (HARB[3..0] == 7) & !ID[0]);
SP[8]  := SELW & (HARB[3..0] == 8) & !IRESET & ID[0]
        # SP[8] & !IRESET & !(SELW & (HARB[3..0] == 8) & !ID[0]);
SP[9]  := SELW & (HARB[3..0] == 9) & !IRESET & ID[0]
        # SP[9] & !IRESET & !(SELW & (HARB[3..0] == 9) & !ID[0]);
SP[10] := SELW & (HARB[3..0] == 10) & !IRESET & ID[0]
        # SP[10] & !IRESET & !(SELW & (HARB[3..0] == 10) & !ID[0]);
SP[11] := SELW & (HARB[3..0] == 11) & !IRESET & ID[0]
        # SP[11] & !IRESET & !(SELW & (HARB[3..0] == 11) & !ID[0]);
SP[12] := SELW & (HARB[3..0] == 12) & !IRESET & ID[0]
        # SP[12] & !IRESET & !(SELW & (HARB[3..0] == 12) & !ID[0]);
SP[13] := SELW & (HARB[3..0] == 13) & !IRESET & ID[0]
        # SP[13] & !IRESET & !(SELW & (HARB[3..0] == 13) & !ID[0]);
SP[14] := SELW & (HARB[3..0] == 14) & !IRESET & ID[0]
        # SP[14] & !IRESET & !(SELW & (HARB[3..0] == 14) & !ID[0]);
SP[15] := SELW & (HARB[3..0] == 15) & !IRESET & ID[0]
        # SP[15] & !IRESET & !(SELW & (HARB[3..0] == 15) & !ID[0]);

IRESETb = !IRESET;

/* ENABLE WRITE MASK-REG DEPENDING ON THE ENABLE SIGNALS IBEb[2] & IBEb[3] */

ENWML = !CSb & !IBEb[2] & !VALIDb & !IRESET & IW_Rb;
ENWMH = !CSb & !IBEb[3] & !VALIDb & !IRESET & IW_Rb;

.SIGNAL MREGI[15..0],MREGO[15..0];

MUX2(ENWML,MREGO[7..0],ID[23..16],MREGI[7..0]);
RREGISTER(NPCLK,IRESETb,MREGI[7..0],MREGO[7..0]);
MUX2(ENWMH,MREGO[15..8],ID[31..24],MREGI[15..8]);
RREGISTER(NPCLK,IRESETb,MREGI[15..8],MREGO[15..8]);

/* ENABLE READ MASK-REG DEPENDING ON THE ENABLE SIGNALS IBEb[2] & IBEb[3] */

!RMASKLb = !CSb & !IBEb[2] & !VALIDb & !IRESET & !IW_Rb;
!RMASKHb = !CSb & !IBEb[3] & !VALIDb & !IRESET & !IW_Rb;

/* ENABLE READ SYNC_POINT-REG DEPENDING ON THE EN-SIGNALS IBEb[0] & IBEb[1] */

!RREGLb =  !CSb & !IBEb[0] & !VALIDb & !IRESET & !IW_Rb;
!RREGHb =  !CSb & !IBEb[1] & !VALIDb & !IRESET & !IW_Rb;

BUFFER(RMASKLb,MREGO[7..0],ID[23..16]);
BUFFER(RMASKHb,MREGO[15..8],ID[31..24]);
BUFFER(RREGLb,SP[7..0],ID[7..0]);
BUFFER(RREGHb,SP[15..8],ID[15..8]);

SETL1=(SP[0] # MREGO[0]) & (SP[1] # MREGO[1]) &
      (SP[2] # MREGO[2]) & (SP[3] # MREGO[3]) &
      (SP[4] # MREGO[4]) & (SP[5] # MREGO[5]) &
      (SP[6] # MREGO[6]) & (SP[7] # MREGO[7]) &
      (SP[8] # MREGO[8]) & (SP[9] # MREGO[9]) &
      (SP[10] # MREGO[10]) & (SP[11] # MREGO[11]) &
```

```
        (SP[12] # MREGO[12]) & (SP[13] # MREGO[13]) &
        (SP[14] # MREGO[14]) & (SP[15] # MREGO[15]);

RESETSLINE=
        (!SP[0]  # MREGO[0])  & (!SP[1]  # MREGO[1])  &
        (!SP[2]  # MREGO[2])  & (!SP[3]  # MREGO[3])  &
        (!SP[4]  # MREGO[4])  & (!SP[5]  # MREGO[5])  &
        (!SP[6]  # MREGO[6])  & (!SP[7]  # MREGO[7])  &
        (!SP[8]  # MREGO[8])  & (!SP[9]  # MREGO[9])  &
        (!SP[10] # MREGO[10]) & (!SP[11] # MREGO[11]) &
        (!SP[12] # MREGO[12]) & (!SP[13] # MREGO[13]) &
        (!SP[14] # MREGO[14]) & (!SP[15] # MREGO[15]);

/* SYNCRONISATION LINE OUTPUT */

SLINE := SETL1
        # SLINE & !RESETSLINE;

.END;
```

1. A computer implemented method of configuring a plurality of series connected functional units of a work station, each of said units including a pointer register, a latch register, and a plurality of configuration registers, comprising:
   a) activating for configuration the first one in the series of units;
   b) consecutively providing an address and corresponding configuration data to the pointer and latch register, respectively, of the activated unit and writing such data from the latch register into one of the configuration registers of the activated unit as selected by the corresponding address held in its pointer register; and
   c) activating for configuration the next unit of the series by generating a signal on a signal line connecting adjacent units upon the pointer register in the preceding unit receiving a predetermined value.

2. A method according to claim 1, further comprising:
   repeating steps "b" and "c" until the last in the series of units is configured.

3. A method according to claim 2, further comprising:
   deactivating the preceding unit when the next unit is activated.

4. A method according to claim 3, further comprising:
   resetting all of said units prior to activating for configuration the first one of the series of units.

5. A method according to claim 4 wherein each of said units but the first has an input line receiving an output signal from the preceding unit, wherein resetting each unit includes deactivating the output signal of each unit, and wherein the next unit is activated when the signal on its input line is active and its output signal is inactive.

6. A method according to claim 5 wherein a unit is deactivated when its output signal is active.

7. A method according to claim 6 wherein each unit is reset by deactivating its output signal.

8. A method according to claim 1, further comprising:
   resetting all of said units prior to activating for configuration the first one of the series of units.

9. A method according to claim 8, wherein said first unit includes a setup register for receiving a setup code from a controlling unit of said work station, said activating step "a" including:
   generating an enabling signal from said code; and
   applying said enabling signal to all of said plurality of units.

10. A method according to claim 9, wherein step "a" includes:
    continuously applying an activating signal to said first unit whereby said first unit is activated for configuration upon receipt of said enabling signal.

11. A method according to claim 10, wherein said activating signal is provided by connecting a port of said first unit to a voltage source via resistive means.

12. A method according to claim 1 wherein said the next unit of the series is activated for configuration upon the pointer register in the preceding unit holding a predetermined final address.

13. A computer implemented method of configuring a plurality of series connected functional units of a work station, each of said units including a pointer register, a latch register, and a plurality of configuration registers, a first unit in the series including a setup register for receiving a setup code from a controlling unit of said work station, comprising:
    resetting all of said units prior to activating for configuration the first one of the series of units;
    generating an enabling signal from said code;
    applying said enabling signal to all of said plurality of units;
    consecutively providing an address and corresponding configuration data to the pointer and latch register, respectively, of the activated unit and writing such data from the latch register into one of the configuration registers of the activated unit as selected by the corresponding address held in its pointer register;

activating for configuration the next unit of the series by generating a signal on a signal line connecting adjacent units upon the pointer register in the preceding unit receiving a predetermined value;

deactivating the preceding unit when the next unit is activated; and repeating the last three steps until the last in the series of units is configured.

14. A method according to claim 13 wherein each of said units but the first has an input line receiving an output signal from the preceding unit, wherein resetting each unit includes deactivating the output signal of each unit, wherein a unit is activated when the signal on its input line is active and its output signal is inactive, wherein a unit is deactivated when its output signal is active, wherein each unit is reset by deactivating its output signal, and wherein the first activating step includes:

continuously applying an activating signal to said first unit whereby said first unit is activated for configuration upon receipt of said enabling signal.

15. A method according to claim 14, wherein said activating signal is provided by connecting a port of said first unit to a voltage source via resistive means, and wherein said the next unit of the series is activated for configuration upon the pointer register in the preceding unit holding a predetermined final address.

16. A work station comprising:
a plurality of functional units, each unit having a pointer register, a latch register and a plurality of configuration registers, wherein the configuration registers of different units share some common addresses;

a local bus connecting said units, wherein the pointer register of each unit consecutively selects the configuration registers of that unit, and the corresponding latch register consecutively transfers configuration data into an addressed one of the configuration registers; and signal lines respectively connecting adjacent units, each unit generating a signal on a respective line for activating for configuration the next unit upon the pointer register of the unit receiving a predetermined value.

17. A work station according to claim 16, wherein said local bus includes a SETUP line for providing an enable signal to all said units.

18. A work station according to claim 17, wherein said units are connected in series, an input port of the first unit in the series being connected to a voltage source via resistive means whereby this unit is activated for configuration in response to receipt of said enable signal, and an output port of each unit in the series, other than the last, being connected to an input port of the next unit in the series by a respective signal line, each unit in the series, other than the last, being arranged to apply the respective one of said signals for activating the next unit in the series upon completion of the configuration of the former.

19. A work station according to claim 18, in which each unit in the series, other than the last, is arranged to generate the relevant activating signal upon its pointer register holding a predetermined address in respect of that register.

20. A work station according to any one of the claims 16 to 19, wherein said local bus includes a RESET line for resetting all configuration registers of said functional units.

21. A work station comprising:
a plurality of functional units, each unit having a plurality of configuration registers and a pointer register, wherein said configuration registers of different units share some common addresses and said pointer register of each unit consecutively selects the configuration registers of that unit for receiving the configuration data;

a local bus, connecting said units, for transferring configuration data to said units one at a time; and signal lines respectively connecting adjacent units, each generating a signal on a respective line for activating for configuring a next unit upon said pointer register of the unit receiving a predetermined value.

* * * * *